US005385701A

United States Patent [19]

Awazu et al.

[11] Patent Number: 5,385,701

[45] Date of Patent: Jan. 31, 1995

[54] METHOD OF MOLDING SILICON NITRIDE CERAMICS

[75] Inventors: Tomoyuki Awazu; Yasushi Tsuzuki; Osamu Komura; Akira Yamakawa, all of Itami, Japan

[73] Assignee: Sumitomo Electric Industries, Ltd., Japan

[21] Appl. No.: 919,590

[22] Filed: Jul. 24, 1992

[30] Foreign Application Priority Data

Jul. 26, 1991 [JP] Japan .................................. 3-187477
Jun. 8, 1992 [JP] Japan .................................. 4-147745

[51] Int. Cl.[6] ........................ C04B 33/28; C04B 33/58

[52] U.S. Cl. .......................................... 264/86; 264/69; 264/71; 264/87

[58] Field of Search ........................ 264/69, 71, 86, 87

[56] References Cited

U.S. PATENT DOCUMENTS 2,897,572 8/1959 Hansen .................................. 264/71

FOREIGN PATENT DOCUMENTS 4037258 5/1991 Germany .
60-70101 4/1985 Japan .
61-217208 9/1985 Japan .
62-132606 6/1987 Japan .................................... 264/71
64-8203 1/1989 Japan .
2-42321 9/1990 Japan .
2155005 9/1985 United Kingdom .
1172720 8/1985 U.S.S.R. ................................ 264/71

OTHER PUBLICATIONS

Bell, Vibratory Compacting of Metal and Ceramic Powders, WADC Tech. Report 53-193, part 3, Mar. 1956 U.S. Dept. of Commerce p. iii and p. 42.
Abstract of DE 4037258.
Chemical Abstracts, vol. 94, No. 8, Abstract No. 51450V D. B. Goel, et al; Effect of Bibration . . . Aluminum Alloy.
Patent Abstracts of Japan JPA-60-070,101; Apr. 20, 1985.

*Primary Examiner*—James Derrington
*Attorney, Agent, or Firm*—Jordan B. Bierman

[57] ABSTRACT

Disclosed herein are a method for molding a high density and homogeneous silicon nitride ceramics within a short time and an apparatus used for the method. A gel-like slurry mixture which is a mixture of ceramic powders consisting mainly of $Si_3N_4$ and a liquid and has a powder content of from 45 vol % to 60 vol % is fluidized by imparting thereto a strain by vibration, and the mixture under the fluidized state is filled into, and molded by, a mold. Preferably, the entire part or a part of the mold is made of a liquid permeable material. The vibration preferably has an acceleration of from 0.1 G to 150 G and an amplitude of 1 μm to 1 cm. Furthermore, the viscosity of the slurry filled into the mold is preferably from 2,000 to 20,000 cps.

2 Claims, 3 Drawing Sheets

1
3
2
4
3

METHOD OF MOLDING SILICON NITRIDE CERAMICS

BACKGROUND OF THE INVENTION

1. Field of the Invention

This invention relates to a molding method and apparatus of silicon nitride ceramic products.

2. Description of the Related Art

According to the prior art, a slurry consisting of a mixture of ceramic powders consisting mainly of $Si_3N_4$ and a liquid is filled into a mold and pressurized, the density of the ceramic particles inside the mold is increased, and the liquid in the slurry is rapidly absorbed by a porous mold material and is discharged. Accordingly, the ceramic particles inside the mold come into pressure contact and a molded article is produced (e.g. Japanese Patent Publication No. 42321/1990 and Japanese Patent Laid-Open No. 70101/1985). A molding method of ceramics which fills regulated ceramic raw materials into a porous mold and molds them while pressuring the materials under vibration is known (e.g. Japanese Patent Laid-Open No. 217208/1986 and No. 8203/1989).

When molding is effected by the conventional pressure cast molding method described above, solidification of the slurry occurs from the portion of a moisture permeable material of the mold. Therefore, the difference of the solidification rates occurs between the inside and outside of the molded article and finally, variance of the density occurs inside the molded article. Particularly, a molded article having a large thickness undergoes deformation such as warp and cracks due to this variance of density. As to a molded article having a complicated shape, a mold design must be made in accordance with the flowing direction of the slurry for the shape of the molded article. As to the slurry, the liquid quantity in the slurry is preferably as small as possible to attain a high density of the molded article and to shorten a solvent removing time from the molded article, but when the liquid quantity in the slurry is reduced, the viscosity of the slurry increases and eventually, the slurry goes to the gel state. Particularly, when ceramic powder consisting mainly of silicon nitride and having a mean particle diameter of not greater than 1 μm, which ceramic powder has been investigated in the present invention, is slurried using water as a solvent, the above-mentioned phenomenon occurs in a high powder content because of the poor wettability of the ceramic powder to water. To cast-mold the slurry under such a high viscosity state or a gel state, an extremely high pressure force is necessary. Accordingly, a mold made of a material capable of withstanding such a high pressure becomes necessary and a molding apparatus becomes great in size from the aspect of installation. The problem of mixture of impurities into the product due to the wear of peripheral components also occurs during pressing at a high pressure.

SUMMARY OF THE INVENTION

The present invention provides a molding method and apparatus which can offer within a short time a high density homogeneous ceramic molded article of silicon nitride by the solidification of a slurry of silicon nitride ceramic. In a molding method using a mixture of ceramic powders consisting mainly of $Si_3N_4$ and a liquid, the gist of the present invention resides in a molding method which imparts strain due to vibration to a gel-like slurry mixture having a powder content of 45 vol % to 60 vol % to fluidize the slurry mixture, fills the slurry mixture under the fluidized state into a mold and molds it, and a molding apparatus equipped with such a mechanism. In this case, the vibration preferably has acceleration of 0.1 G to 150 G and an amplitude of 1 μm to 1 cm.

DETAILED DESCRIPTION OF THE PREFERRED EMBODIMENTS

Generally, a silicon nitride ceramic slurry has thixotropy. Thixotropy represents the phenomenon in which the structure of the aggregate of fine particles is destroyed by the application of stress to reduce their viscosity, and the highly viscous slurry is likely to fluidize. In an extreme case, a gel-like material which is not fluidized changes to a sol-like state. The drop of this viscosity in thixotropy is maintaining for a predetermined time even after the application of the stress is terminated, and the viscosity does not immediately return to the high viscosity before the application of the stress. The method of applying the stress, which is believed effective industrially for generating this phenomenon, relies on vibration.

When the vibration is imparted to the mold at the stage of solidification of the slurry during its cast molding, fluidization of the slurry occurs inside the mold due to the occurrence of thixotropy, and the slurry having a small liquid content and coming into contact with the mold made of a liquid permeable material and the slurry having a large liquid content inside the molded article undergo mutual fluidization, and are solidified under the state where uniformity of the density is maintained inside and outside the molded article. Finally, a homogeneous and high density molded article, which cannot be obtained by mere pressing, can be produced. To shorten the time required for molding in consideration of productivity, the liquid quantity of the slurry must be reduced. The reduction of the liquid quantity of the slurry has the function of increasing the density of the molded article, too. From these aspects, the liquid in the slurry is preferably as little as possible.

Figure 5:
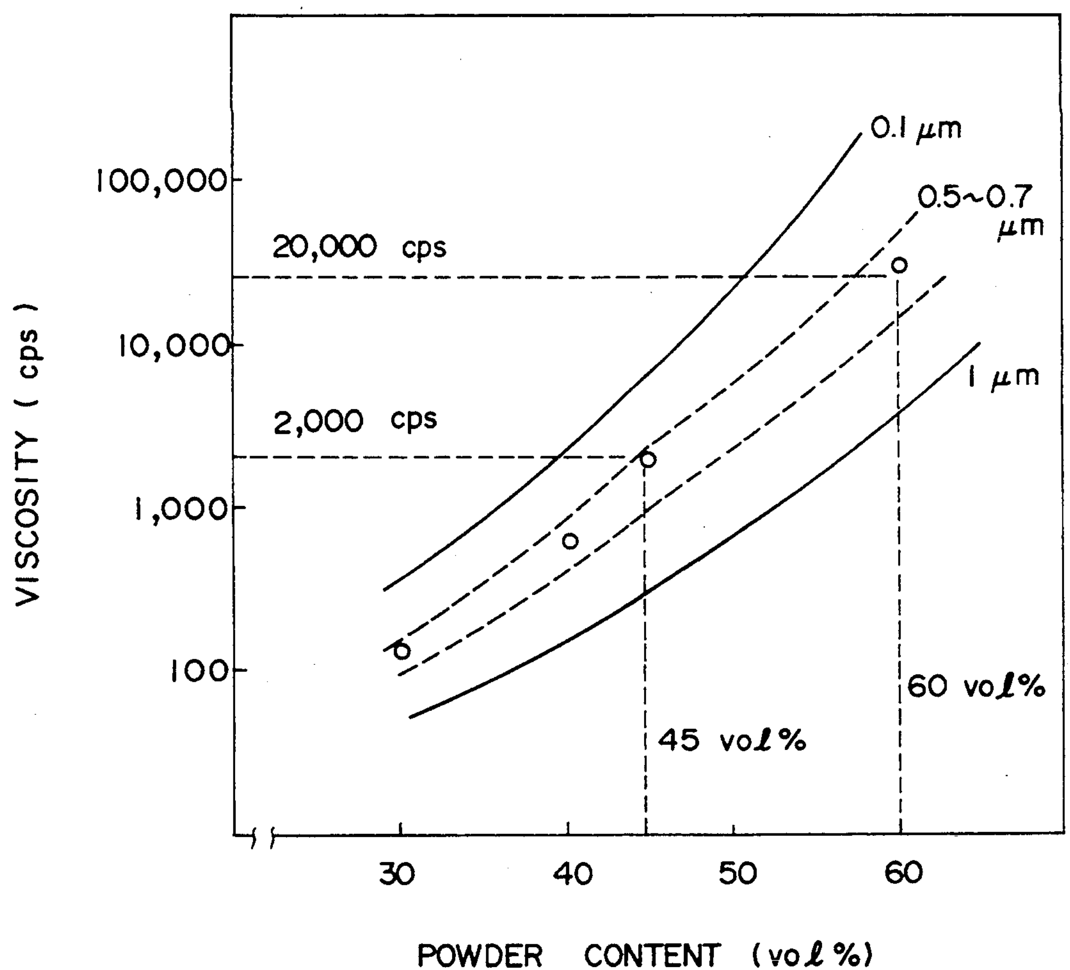
FIG. 5 shows the relationship of powder content (% by volume) to viscosity for slurries consisting of silicon nitride ceramic powder and water.

When the liquid quantity is reduced, however, the viscosity increases, and the slurry goes to the gel state and does not undergo fluidization. The occurrence of this gelling varies depending on the kind of ceramic powder, the particle diameter, the surface condition, the kind of the liquid, etc. As shown in FIG. 5, in the case of a slurry consisting of silicon nitride ceramic powder having a mean particle diameter of 0.1 to 1 μm and water (as a solvent), the viscosity of the slurry is generally from 2,000 cps to 20,000 cps when the powder content is in the range of 45 to 60 vol. %. The range between the dotted lines shown in FIG. 5 shows the relationship of powder content and to viscosity for silicon nitride ceramic powder having a mean particle diameter of 0.5 to 0.7 μm. Within this range, the strength and Weibull coefficient of the resultant sintered body can be further improved. If the slurry under the gel state can be fluidized and can be filled into the mold, both of the reduction of the molding time and the improvement in the density of the molded article can be accomplished.

The reduction of the molding time and the high density can be accomplished if the thixotropy phenomenon is generated in the gel state by vibration and the slurry can be fluidized and molded. One of the methods for accomplishing this object is the method which fills a gel-like slurry into a mold, applies vibration to the entire part of the mold so as to generate thixotropy, and fluidizes and fills the slurry inside the mold. In this case, however, the slurry must have fluidity to such an extent that it can be filled into the mold, and the viscosity must be generally not greater than 2,000 cps. Fluidization-filling is not possible in the case of a high concentration and high viscosity gel-like slurry as the object of the present invention. When such a slurry is filled compulsively into the mold, the gel-like slurry inside the mold is restricted by the mold, its strain due to vibration is small, thixotropy does not occur easily, the slurry is not fluidized even when pressure dehydration is made, and the slurry is heterogeneous and cannot be molded to a high density.

In the case of the high viscosity slurry having a viscosity of 2,000 cps or more as the slurry of the present invention, the gel is not as it is filled into the mold, but the slurry is caused to flow into the mold after vibration is in advance imparted to the slurry so as to generate fluidity by thixotropy. Molding is carried out after the slurry is filled into the mold. When the application of vibration is terminated, the slurry is gelled (solidified) and turns to a molded article. To remove the liquid inside the slurry, whenever necessary, a liquid permeable material is used for the whole, or part, of the mold, and cast molding, pressure cast molding or pressure cast molding with the application of vibration can be carried out.

According to this method, a slurry under the gel state with a high viscosity, not having fluidity and having a small liquid quantity can be molded, and a high density molded article can be produced within a short time. Since filling of the slurry can be made uniformly and at a high density, the density of the molded article can be improved even at a low pressure or without pressure. Furthermore, depending on the shape of the article to be molded, molding can be carried out by imparting the vibration not to the mold as a whole but only to the feeder of the slurry, and in this way, the cost of installation can be drastically reduced. The gel used hereby means the state where fluidization does not occur easily, and the application range of viscosity is at least 2,000 cps at which cast molding is not possible generally.

The degree of the occurrence of thixotropy varies with the frequency and amplitude of the vibration to be imparted. The vibration condition is determined in accordance with the intensity of the pressure applied, the particle size of the ceramic powder, the surface condition of the ceramic powder particles, the liquid quantity in the slurry, the kind of the liquid, dispersibility of the powder, the amount of an organic binder, and a pH value when the liquid is water, as an effective thixotropy generation condition.

The inventors made intensive studies on the vibration condition for effectively generating thixotropy in slurries comprising silicon nitride powder having a mean particle diameter of 0.1 to 1.0 μm and water as a solvent and found out that thixotropy was induced drastically under the condition where the acceleration of the vibration was from 0.1 G to 150 G and the amplitude was from 1 μm to 1 cm. In order to impart stress capable of destroying a gel-like particle structure through a solvent, the acceleration of the vibration must be at least 0.1 G and its amplitude must be at least 1 μm. When the acceleration of the vibration exceeds 150 G or when its amplitude exceeds 1 cm, the installation becomes too great for the practical application. To industrially utilize the present invention, the acceleration and amplitude of the vibration to be imparted are preferably 150 G or less and 1 cm or less, respectively.

A metal mold is used as a mold used for molding in order to obtain high dimensional accuracy and good surface roughness. In this case, a moisture permeable mold may be used for a part. When the metal mold is provided with pores and moisture permeability, a molded article having a high density and excellent homogeneity can be produced within a short time. The moisture permeable mold retains the pores and removes the liquid and in this case, the pore distribution can be controlled in accordance with the particle size of the powder. In this way, higher moisture permeability can be obtained and the molding time can be further reduced.

Hereinafter, embodiments of the invention for a limited range of application will be explained, but the present invention is not limited thereto.

EXAMPLE 1

Figure 1:
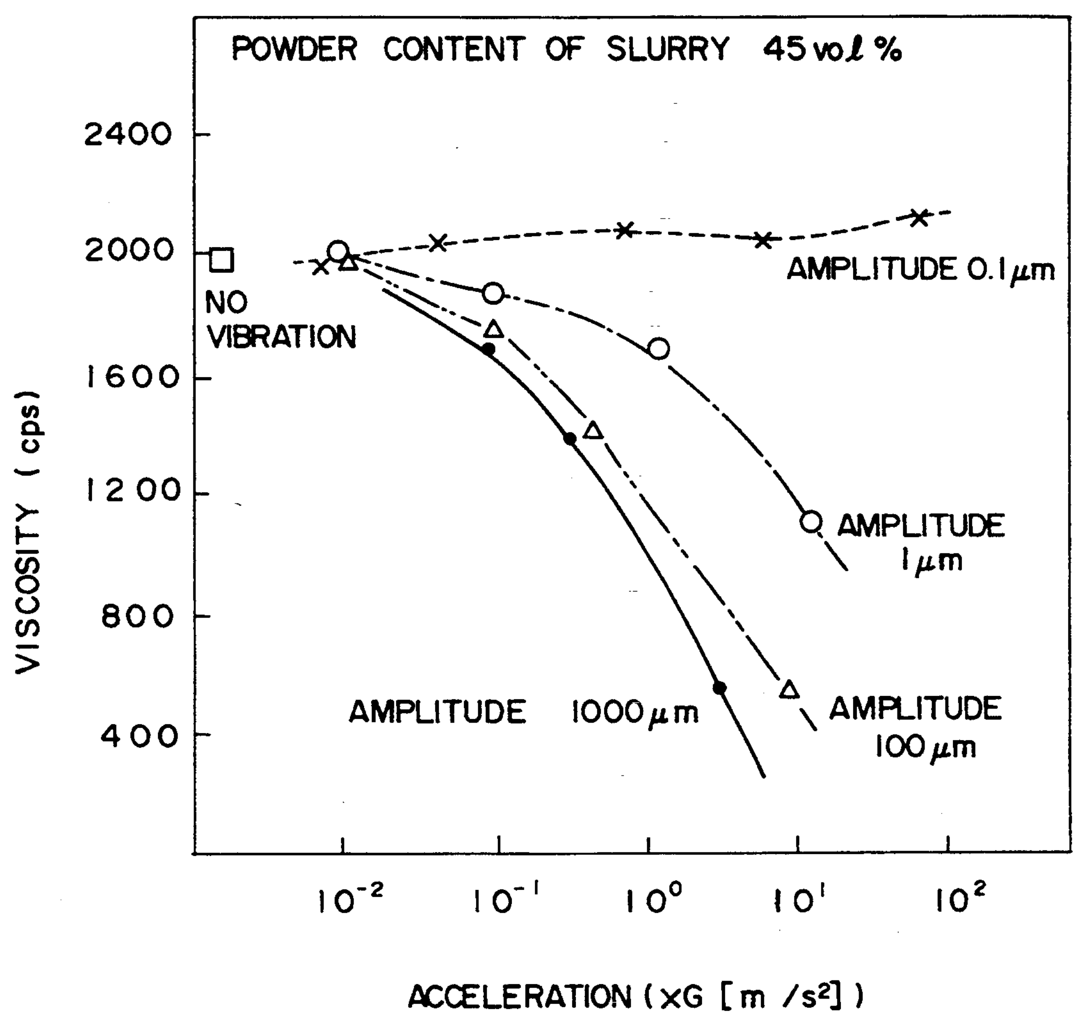
FIG. 1 is a diagram showing the drop of a viscosity with respect to vibration acceleration imparted.
Figure 2:
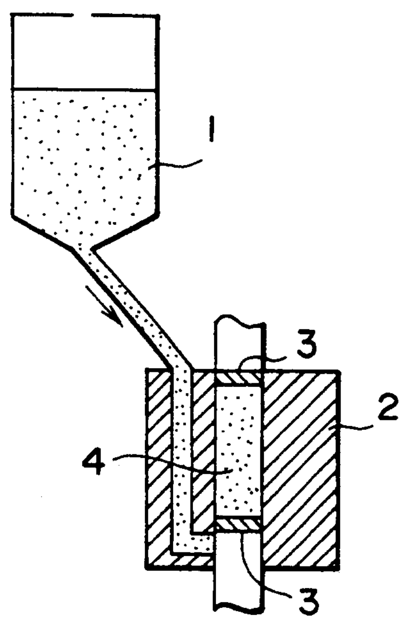
FIGS. 2, 3 and 4 are schematic views useful for explaining a molding method according to an embodiment of the present invention.
Figure 3:
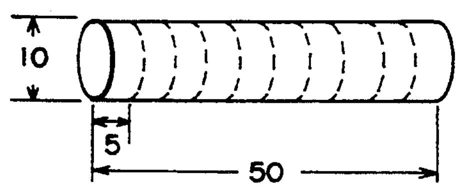

Mixed powder was prepared by adding and mixing $Y_2O_3$ and $Al_2O_3$ as adjuvants to $Si_3N_4$ powder having a mean particle size of 0.5 μm. Distilled water was added as a solvent to the mixed powder, and slurries having various powder contents, as shown in Table 1 were prepared. As shown in a schematic diagram of FIG. 2, vibration conditions having different accelerations and frequencies, as shown in Table 1 were applied to these slurries 1 and each slurry was filled into a mold 2. A metal mold having a diameter of 10 mm was used as the mold 2, and the slurry was pressurized from above and below by a porous member 3 to obtain a columnar molded article 4 having a diameter of 10 mm and a length of 50 mm. The density of each molded article and the molding time are tabulated in Table 2. FIG. 1 shows the drop of an initial viscosity, i.e. 2,000 cps, to each vibration acceleration applied. Each of the resulting columnar molded articles was equally cut into ten pieces as shown in FIG. 3. The density of each of these ten molded articles was calculated from their mass and dimensions, and the difference between the greatest and smallest values among the ten densities was divided by the mean of the ten densities. The quotient thus obtained was shown as the variance of density in Table 2.

Figure 4:
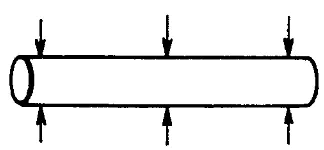

To evaluate sintered bodies, 30 columnar molded articles were produced under the conditions shown in Table 1 in the same way as set forth above. These molded articles were sintered in a nitrogen atmosphere, and the outer diameters of the resulting 30 sintered bodies were measured at positions (3 positions per sintered body) shown in FIG. 4. The difference between the greatest and smallest values of the outer diameters ($30\times3=90$ positions) under each vibration condition is shown as an outer diameter variance in Table 2. Furthermore, sintered bodies were processed in accordance with the stipulations of JIS R1601, and 4-point bending test was carried out.

TABLE 1

| No. | Powder content of slurry (%) | Slurry viscosity (cps) | Vibration condition Acceleration (G) | Amplitude (μm) | Frequency (Hz) |
|---|---|---|---|---|---|
| *1 | 40 | 700 | 0.01 | 1 | 50 |
| *2 | 40 | 700 | 0.1 | 10 | 50 |
| *3 | 40 | 700 | 10 | 1000 | 50 |
| *4 | 40 | 700 | 10 | 0.1 | 5000 |
| *5 | 40 | 700 | 100 | 1 | 5000 |
| *6 | 45 | 4800 | 0.01 | 1 | 50 |
| *7 | 45 | 4800 | 0.01 | 5 | 50 |
| 8 | 45 | 4800 | 0.1 | 10 | 50 |
| 9 | 45 | 4800 | 10 | 1000 | 50 |
| *10 | 45 | 4800 | 10 | 0.1 | 5000 |
| 11 | 45 | 4800 | 100 | 1 | 5000 |
| *12 | 45 | 4800 | 100 | 0.1 | 15800 |
| *13 | 50 | 16900 | 0.01 | 1 | 50 |
| *14 | 50 | 16900 | 0.01 | 5 | 50 |
| 15 | 50 | 16900 | 0.1 | 10 | 50 |
| 16 | 50 | 16900 | 10 | 1000 | 50 |
| *17 | 50 | 16900 | 10 | 0.1 | 5000 |
| 18 | 50 | 16900 | 100 | 1 | 5000 |
| *19 | 50 | 16900 | 100 | 0.1 | 15800 |

*Comparative examples
*1 to *5 are Comparative Examples using low viscosity (low concentration) slurries.
*6, 7, 13 and 14 are Comparative Examples by low acceleration vibration at each slurry viscosity (concentration).
*10, 12, 17 and 19 are Comparative Examples by low amplitude vibration at each slurry viscosity (concentration). In the case of high amplitude (exceeding 10,000 μm), the problem occurred with the construction of installation (fixing of installation was difficult).

Also, non-uniformity of the powder concentration inside the mold becomes easier to occur and variance of the density of the molded article becomes great. As a result, variance of the dimension of the sintered bodies becomes great, too, and the strength drops.

b) When the acceleration to be applied to the sol is below 0.1 G or when the amplitude is below 1 μm, sufficient thixotropy cannot be obtained even when the slurry concentration is greater than 2,000 cps, and the feed cannot be made smoothly. Consequently, the molding time becomes long and this condition is not efficient. At the same time, non-uniformity of the density after molding becomes great. As a result, variance of the dimensions after sintering becomes great and the strength level drops.

c) When the slurry concentration and the viscosity become further higher, and when the acceleration is below 0.1 G or the amplitude is below 1 μm, feedable thixotropy fluidization does not occur and filling of the slurry into the mold becomes impossible.

EXAMPLE 2

A powder mixture was prepared by adding $Y_2O_3$ having mean particle diameter of 0.7 μm and $Al_2O_3$ having a mean particle diameter of 0.5 μm as adjuvants to $Si_3N_4$ powder having a mean particle diameter of 0.5 μm, and distilled water was added to this mixture to obtain a mixture with water and distilled water. The water content of the resulting mixture was adjusted to the powder content of 55 vol %. The mixture did not exhibit fluidization but went to the gel state. Various vibrations were imparted to this mixture, and the mixtures exhibiting fluidization were filled into a sheet-like mold of 100 mm×100 mm×5 mm and were dried to provide molded articles. The results is shown in Table 3.

TABLE 2

| No. | Molding density (%) | Molding time (sec) | Variance of molding density $\frac{(density_{max} - density_{min})}{mean\ density} \times 100(\%)$ | Properties of sintered body: variance of outer diameter (mm) | 4-point bending strength (kgf/mm²) | weibull coefficient of 4-point bending strength |
|---|---|---|---|---|---|---|
| 1 | 51.5 | 82 | 0.98 | 0.123 | 99 | 13 |
| 2 | 51.9 | 79 | 0.85 | 0.110 | 102 | 17 |
| 3 | 52.0 | 78 | 0.83 | 0.102 | 103 | 17 |
| 4 | 51.3 | 81 | 1.01 | 0.114 | 99 | 16 |
| 5 | 51.4 | 79 | 0.97 | 0.111 | 92 | 10 |
| 6 | 51.8 | 50 | 0.30 | 0.120 | 98 | 16 |
| 7 | 51.9 | 45 | 0.24 | 0.109 | 110 | 17 |
| 8 | 54.8 | 20 | 0.09 | 0.054 | 121 | 21 |
| 9 | 54.9 | 19 | 0.08 | 0.048 | 122 | 22 |
| 10 | 52.0 | 38 | 0.25 | 0.101 | 108 | 17 |
| 11 | 55.2 | 17 | 0.07 | 0.039 | 124 | 23 |
| 12 | 51.9 | 40 | 0.25 | 0.110 | 109 | 16 |
| 13 | ** | — | — | — | — | — |
| 14 | ** | — | — | — | — | — |
| 15 | 59.2 | 18 | 0.03 | 0.019 | 129 | 25 |
| 16 | 59.7 | 14 | 0.02 | 0.013 | 132 | 25 |
| 17 | ** | — | — | — | — | — |
| 18 | 60.1 | 14 | 0.02 | 0.012 | 135 | 26 |
| 19 | ** | — | — | — | — | — |

Remark: ** Filling into a mold was impossible.

The following points can be understood clearly from Example given above.

a) When the vibration condition of the present invention is applied to the sol having a slurry concentration of less than 45 vol %, the feed by thixotropy is possible, but solidification of the slurry by moisture permeation drying takes a long time after it is filled into the mold.

TABLE 3

| No. | Vibration condition acceleration (G) | amplitude (μm) | frequency (Hz) | Change of condition of mixture when vibration was imparted | Density of molded article (%) |
|---|---|---|---|---|---|
| 1* | 0.01 | 0.1 | 158 | not fluidized | — |
| 2* | 0.01 | 1 | 50 | not fluidized | — |
| 3* | 0.01 | 0.1 | 500 | not fluidized | — |
| 4 | 0.1 | 1 | 156 | fluidized filling | 59.8 |

TABLE 3-continued

| No. | Vibration condition acceler-ation (G) | ampli-tude (μm) | frequency (Hz) | Change of condition of mixture when vibration was imparted | Density of molded article (%) |
|---|---|---|---|---|---|
| | | | | into mold was possible | |
| 5* | 1 | 0.1 | 1576 | not fluidized | — |
| 6 | 1 | 1 | 500 | fluidized filling into mold was possible | 60.1 |
| 7* | 10 | 0.1 | 5000 | not fluidized | — |
| 8 | 10 | 1 | 1576 | fluidized filling into mold was possible | 60.2 |

*Comparative Example

It can be understood from the result given above that fluidization does not occur even when the frequency changes, unless predetermined acceleration and amplitude are imparted.

According to the present invention, a high density and homogeneous silicon nitride molded article having high dimensional accuracy can be obtained within a short time. Molding can be made by an economical equipment and moreover, products having complicated shapes and a large thickness can be obtained depending on intended products by making contrivances to the mold, and finish can be omitted. Therefore, the present invention provides an extremely great economical effect.

What is claimed:

1. A method of cast molding or pressure cast molding silicon nitride ceramics from a mixture of ceramic powders consisting essentially of $Si_3N_4$ and a liquid, a mean particle diameter of said $Si_3N_4$ being 0.1 to 1.0 μm, in which strain is imparted to a gel-like slurry mixture having a powder content of 45 vol % to 60 vol %, by vibrating said gel-like slurry mixture at an acceleration of 0.1 G to 150 G, and an amplitude of 1 μm to 1 cm, to fluidize said slurry mixture, feeding said mixture, in a fluidized state, into a mold formed at least in part of a material which permits permeation of liquid therethrough, no vibration being applied to said mold, and allowing said mixture in said mold to solidify by stopping application of strain to said mixture while simultaneously conducting a molding operation to form a molded body.

2. A molding method of silicon nitride ceramics according to claim 1, wherein the viscosity of said mixture of said ceramic powders and said liquid to be filled into said mold is from 2,000 to 20,000 cps.

* * * * *